(12) United States Patent
Teggatz et al.

(10) Patent No.: US 9,954,448 B2
(45) Date of Patent: *Apr. 24, 2018

(54) CURRENT MODE REGULATOR

(71) Applicant: TRIUNE SYSTEMS, LLC, Plano, TX (US)

(72) Inventors: Ross E. Teggatz, Plano, TX (US); David Briggs, Plano, TX (US); Amer H. Atrash, Plano, TX (US); Wayne T. Chen, Plano, TX (US)

(73) Assignee: TRIUNE SYSTEMS, LLC, Plano, TX (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/155,909

(22) Filed: May 16, 2016

(65) Prior Publication Data

US 2016/0261197 A1   Sep. 8, 2016

Related U.S. Application Data

(63) Continuation of application No. 13/567,039, filed on Aug. 4, 2012, now Pat. No. 9,343,988.

(60) Provisional application No. 61/515,782, filed on Aug. 5, 2011.

(51) Int. Cl.
| | |
|---|---|
| *H02M 3/335* | (2006.01) |
| *H02M 1/42* | (2007.01) |
| *H02M 1/14* | (2006.01) |
| *H02M 1/08* | (2006.01) |
| *H02M 3/338* | (2006.01) |
| *H02M 1/00* | (2006.01) |

(52) U.S. Cl.
CPC ......... *H02M 3/33507* (2013.01); *H02M 1/08* (2013.01); *H02M 1/14* (2013.01); *H02M 1/42* (2013.01); *H02M 3/3387* (2013.01); *H02M 1/4225* (2013.01); *H02M 2001/0006* (2013.01); *H02M 2001/0009* (2013.01); *H02M 2001/0032* (2013.01); *Y02B 70/126* (2013.01); *Y02B 70/16* (2013.01)

(58) Field of Classification Search
CPC .. H02M 3/33507; H02M 3/3387; H02M 1/08; H02M 1/14; H02M 1/42
See application file for complete search history.

(56) References Cited

U.S. PATENT DOCUMENTS

| | | |
|---|---|---|
| 5,570,276 A | 10/1996 | Cuk et al. |
| 8,339,188 B1 | 12/2012 | Silver et al. |
| 2008/0055940 A1 | 3/2008 | Lawson et al. |
| 2008/0198638 A1 | 8/2008 | Reinberger et al. |
| 2011/0038189 A1 | 2/2011 | Whittam et al. |

*Primary Examiner* — Nguyen Tran
*Assistant Examiner* — Monica Mata
(74) *Attorney, Agent, or Firm* — Jackson Walker LLP; Christopher J. Rourk

(57) ABSTRACT

Disclosed are advances in the arts with novel and useful current mode regulators. Circuits, systems, and methods for current mode regulation include a primary side for receiving an input signal and a secondary for outputting an output signal. A regulator spans the primary and secondary sides in a configuration by which the input signal may be rectified and thereafter provided to the output node as an output signal. A current monitor is provided at the output node for comparing the output signal to a reference. A communication link is included for providing feedback to the primary side of the regulator for use in regulating the signal.

16 Claims, 1 Drawing Sheet

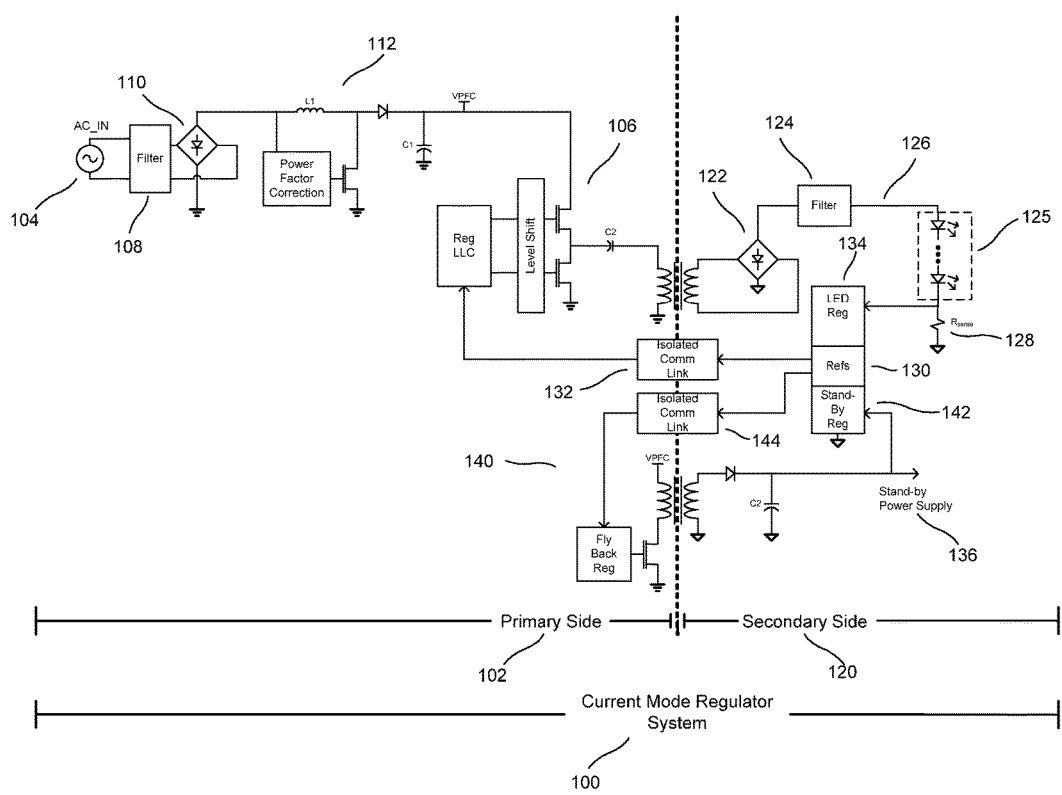

CURRENT MODE REGULATOR

PRIORITY ENTITLEMENT

This application is a continuation patent application of Ser. No. 13/567,039 filed Aug. 4, 2012, which claims priority from Provisional Ser. No. 61/515,782 filed Aug. 5, 2011, which are hereby incorporated by reference.

TECHNICAL FIELD

The invention relates to apparatus, systems and methods for controlling power conversion. More particularly, the invention relates to current mode regulation circuitry and associated techniques for converting alternating current to direct current in isolation and providing current feedback.

BACKGROUND OF THE INVENTION

Many power supply and charger systems utilize an AC power source for their input power and convert the AC power to DC power for the output, and then require, for example, a boost converter, or one or more alternative converters to power system elements that require DC power, such as LEDs for example, as used for back-lighting in electronic displays. Power efficiency, board space, and cost are concerns in such systems, as well as system reliability.

Due to these and other problems and potential problems with the current state of the art, improved apparatus, systems and methods for controlling AC to DC power conversion and regulating DC current to DC load elements in electronic systems would be a useful and advantageous contribution to the art.

SUMMARY OF THE INVENTION

In carrying out the principles of the present invention, in accordance with preferred embodiments, the invention provides advances in the arts with novel apparatus, systems, and associated methods directed to useful and advantageous improvements to power conversion and control in electronic systems.

According to one aspect of the invention, an example of a preferred embodiment of a current mode regulator is embodied in a circuit including a primary side for receiving an input signal at an input node and a secondary having an output node for outputting an output signal. A resonant LLC regulator or alternative regulator spans the primary and secondary sides in a configuration by which the input signal may be rectified and thereafter provided to the output node as an output signal. A current monitor is provided at the output node for comparing the output signal to a reference. A communication link is included for providing feedback to the primary side of the LLC or alternative regulator for regulating the signal provided to the output node.

According to another aspect of the invention, in an exemplary embodiment an electronic system includes a current mode regulator with a primary side for receiving an input signal at an input node and a secondary side for outputting an output signal at an output node. A current monitor at the output node is provided for comparing the output signal to a reference, and a communication link is provided for sending feedback to the primary side of an LLC regulator or alternative regulator configured for using the feedback to regulate the signal. The system also includes a stand-by power supply having a fly-back converter or an alternative second converter and a standby regulator. A second communication link passes feedback from the stand-by regulator to the fly-back converter or an alternative second converter for regulating the stand-by power supply.

According to another aspect of the invention, an exemplary embodiment of a method of current mode regulation includes steps for receiving and rectifying an input signal and regulating the passing of the rectified signal to an isolated secondary side having an output node. In a further step, the signal passed to the secondary side is rectified and is in turn passed to the output node. In a monitoring step, the signal at the output node is compared with a reference; and while maintaining isolation between the secondary side and the primary side, feedback is provided from the output node to the primary side and used for regulating the signal.

According to aspects of the invention, in examples of preferred embodiments, the isolated communication from the secondary side to the primary side uses an optical communication signaling method and associated apparatus.

According to additional aspects of the invention, exemplary preferred embodiments include communication from the secondary side to the primary side using inductive communication circuitry and signaling.

According to additional aspects of the invention, exemplary alternative embodiments include communication from the secondary side to the primary side using capacitive communication circuitry and signaling.

The invention has advantages including but not limited to providing reductions in current mode regulator circuit complexity, and/or providing increased reliability, and/or reduced costs. These and other advantageous features and benefits of the present invention can be understood by one of ordinary skill in the arts upon careful consideration of the detailed description of representative embodiments of the invention in connection with the accompanying drawing.

BRIEF DESCRIPTION OF THE DRAWING

The present invention will be more clearly understood from consideration of the following detailed description and drawing in which:

FIG. 1 is a simplified schematic diagram depicting an electronic circuit that may provide current mode regulation according to an embodiment of the present invention.

References in the detailed description correspond to like references in the drawing unless otherwise noted. Descriptive and directional terms used in the written description such as front, back, top, bottom, upper, side, et cetera; refer to the drawing itself as laid out on the paper and not to physical limitations of the invention unless specifically noted. The drawing is not to scale, and some features of embodiments shown and discussed are simplified or amplified for illustrating principles and features, as well as advantages of the invention.

DETAILED DESCRIPTION

While the making and using of various exemplary embodiments of the invention are discussed herein, it should be appreciated that the present invention provides inventive concepts which can be embodied in a wide variety of specific contexts. It should be understood that the invention may be practiced with various electronic systems in which power conversion and/or current regulation is desirable without altering the principles of the invention. The examples of circuits and techniques shown and described herein are representative embodiments, and may be used in various combinations. For purposes of clarity, detailed descriptions of functions, components, and systems familiar to those skilled in the applicable arts are not included. In general, the present disclosure provides advantageous advances in the art by providing a novel circuitry embodiment for current mode regulation in AC to DC converters.

An exemplary embodiment of a current mode regulator circuit 100 is illustrated in FIG. 1. The system 100 is an example of an isolated LED current control circuit. Those skilled in the art will readily appreciate that the current mode regulator topology 100 may be used in a broad variety of contexts without departure from the essentials of the apparatus and related methods described and shown herein. Referring to FIG. 1, a primary side 102 and a secondary side 120 of the circuit 100 are shown. As can be seen at the left side of the FIGURE, an AC power supply 104 provides an AC input that enters at the primary side 102 of the system 100. This energy is isolated using, for example, a resonant LLC circuit 106, sometimes also referred to in the art as an SPRC (Series Parallel Resonant Converter). On the primary side 102, an incoming AC signal may, or may not, have an optional filter 108 in order to attenuate electromagnetic interference prior to being rectified by a rectifier 110. Downstream from the rectifier 110, a power factor controller 112 may optionally be used to create a power efficient VDC/VPFC voltage as a supply for the LLC regulator 106 and fly-back regulator (140, further described infra). Alternatively, a filtered rectification configuration (not shown) may be implemented with filtering to provide VDC voltage to the LLC 106.

Now referring to the secondary side 120 of the circuit shown in the right side of FIG. 1, the secondary side of the LLC 106 includes a rectifier 122, which can in turn pass its output signal to an optional filter 124 to reduce voltage ripple to the DC load at an output node 126, as well as to provide stability for the overall loop of the LLC current mode system. In this case, the load 126 includes a number of LEDs 125, although it should be understood that the exact composition of the load 126 is not an essential element of the invention. By way of example, references herein to the output node, LEDs, and load are intended to be synonymous. Preferably, current is monitored in the LED stack 125, shown in this illustrative embodiment as sensing a voltage across a sense resistor 128. This monitored current is then compared against a reference 130 and then sent as feedback to the primary side 102 through an isolated communication link 132. Other current sensing methods may also be used as well, such as mirroring or direct sensing of the power FET, or Hall effect, to name a few examples. In some applications it may be preferable to monitor voltage or some other circuit parameter(s) at the output node.

In order to improve overall efficiency and lower the consumption of standby power, the reference circuitry 130 may preferably be configured in one or more of the following manners. The reference voltage may be obtained, for example, using a floating gate technique, low power bandgap, multiple floating gates for redundancy and/or accuracy, a bandgap operating at a less than 100% duty cycle, a combination of a floating gate reference and a bandgap used to calibrate or re-program the floating gate to compensate for retention losses in the floating gate, or any other low power or conventional technique. The reference circuit 130 may be configured to have low (e.g., on the order of nano-amps or lower) bias current. This is one example of a regulation scheme which may be used. Alternative equivalent circuits may also be used without departure from the scope of the invention.

The isolated communication link 132 interfacing the primary 102 and secondary 120 sides of the LLC 106 may be configured in the following alternative manners. For example, the isolated communication link 132 may be optical, magnetic, capacitive, or resistive. Capacitive or inductive elements may be implemented in a variety of ways, for example, using integrated, discrete components, or printed as part of a PCB. Further, capacitive or inductive elements may be implemented in a combination of the ways just described, as well as other ways. In a PCB, a capacitively coupled element may be formed from two or more lines or structures that are stacked vertically using two or more planes, or may be placed adjacent to one another in the same plane. Alternatively, inductive elements may be provided in a variety of formations, such as vertically stacked or interleaved coils. These may be placed on one or more levels of the PCB. They may alternatively be placed on one or more separate PCBs, which are then arranged appropriately for inductive communication.

The isolated regulator topology may use a variety of regulation schemes. For example, the load regulation control 134 may be adjusted by changing the frequency, duty cycle, or a combination of the two in order to regulate the current through the load, e.g., LED stack 125, on the secondary side 120. In other embodiments, the load regulation control 134 may optionally use resonant or non-resonant (e.g., fly-back) techniques. In alternative embodiments, other techniques may also be used, including the use of a main feedback loop and second feedback loop, wherein the main feedback loop resides on the primary side 102 and the second feedback loop communicates from the secondary side 120 to the primary side 102. This technique may provide additional stability robustness as well as improved transient response. Alternatively, the second feedback loop may be eliminated, if, for example, accurate current regulation on the secondary side 120 is not desired for a particular implementation.

Regulator switching may also be dithered to minimize radiated emissions from the system 100. For example, this may be accomplished using digital control of the gate drive (FET) frequency or, for example, analog distortion of the gate drive signal. In some embodiments, the FET switching frequency may be varied continuously during operation. For example, this may limit the amount of energy emitted at any particular frequency of operation. The FET gate drive control may also be used to minimize RFI. For example, this may be achieved using a driver with variable resistance, a driver with a dynamically adjustable or resistively limited supply, staged turn-on of multiple portions of the driver circuit, use of single or multiple current sources to drive the gate, or use of an optional external series gate resistor. In some embodiments, a combination of these approaches may be used. In alternative embodiments, other approaches may be used.

A stand-by power supply 136 may also be provided in the system 100 through the fly-back converter 140. In one embodiment, the voltage of the stand-by power supply 136 may be monitored by the stand-by regulator 142 using, for example, a voltage reference. Feedback for the fly-back converter 140 may be provided by an isolated communication link 144 back to the primary side 102 in a manner, for example, similar to that of the isolated communication link 132 used for the load 126 regulator 134. The voltage reference used, e.g., 130, may be similar to, and may be shared with, the reference used by the load regulator 134. This may save power. The isolated communication link 144 may be implemented using optical, magnetic, capacitive, or resistive means. Capacitive or inductive elements may be implemented using integrated, discrete components, or may be printed as part of a PCB. Further, capacitive or inductive elements may be implemented in a combination of the ways just described, as well as other ways. In a PCB, a capacitively coupled element may be formed from two or more lines or structures stacked vertically using two or more planes, or placed adjacent in the same plane. Inductive elements may also be formed in various ways, such as vertically stacked or interleaved coils. These may be placed on one or more levels of the PCB. They may also be placed on one or more separate PCBs, appropriately positioned.

The making and using of various exemplary embodiments of the invention are described. It should be appreciated that the inventive concepts can be embodied in a wide variety of specific contexts. All equivalent structures and techniques cannot, and need not be shown and described. Further examples representative of the invention and particular aspects thereof are provided, but are not exclusive of other similar and equivalent configurations.

The stand-by regulator 142 may, for example, include amplifiers or comparators that may be dynamically biased. In some embodiments, dynamic biasing may allow the regulator 142 stability or other performance parameters to adjust based on, for example, the regulator 142 loading and/or other parameters. For example, this approach may minimize power consumption that may be desirable when, for example, operating in stand-by mode when power savings may be important.

The output node 126 may be monitored using various techniques in place of or in addition to the use of a comparator, such as an analog-to-digital converter, or a threshold detector.

In alternative embodiments, additional voltage supplies may be provided, for example, by adding windings or additional taps on the transformer portion of the LLC 106.

The fly-back regulator 140 may be configured for control by changing the frequency, duty cycle, or a combination of the two in order to regulate the current through the load 126 on the secondary side 120. In some embodiments, the fly-back regulator 140 may be configured for control using other approaches. Alternatively, other regulation schemes may be used.

Fly-back switching may also be dithered to minimize radiated emissions from the system 100. For example, this may be accomplished using digital control of the gate drive frequency or, for example, analog distortion of the gate drive signal. In some embodiments, the FET switching frequency may be varied continuously during operation. For example, this may limit the amount of energy emitted at any particular frequency of operation.

A FET gate drive control may also be used to minimize RFI. This may be implemented using a driver with variable resistance, a driver with a dynamically adjustable or resistively limited supply, staged turn-on of multiple portions of the driver circuit, use of a single or multiple current sources to drive the FET gate, use of sinusoid drive schemes, use of low, THD (Total Harmonic Distortion) drive schemes, or use of an optional external series gate resistor. In some embodiments, a combination of these approaches may be used. In alternative embodiments, other approaches may be used.

The control on the primary side 102 for both the LLC and fly-back regulators 106, 140, may be exercised using all analog, all digital, or any other partitioning of analog and digital circuits. Loop control may be achieved using any combination of voltage or current sensing on the primary side 102 or voltage or current sensing on the secondary side 120 with the use of an isolated or other communication element. A digital controller may be used to adjust the loop parameters or compensation based on any sensed parameter, such as input or output current or voltage, temperature, or some user input. In this implementation, a z-domain approach may be used. In other implementations, an s-domain loop approach may be used. In some embodiments, a digital control loop along with supporting analog sensing, such as but not limited to DACs and ADCs, and switching functions, such as but not limited to clocking and power switching, may be used to provide greater level of control, adaptability and scale.

The principles and techniques of the invention are shown in an isolated topology embodiment but can be applied to other embodiments as well, for example isolated or non-isolated power converter topologies. One or more isolated or non-isolated outputs may be used. The principles of the invention may also include any combination of current output or voltage output. In addition, any of these apparatus and/or techniques may be used singularly or in combination with any other.

The circuits, systems, and techniques of the invention provide one or more advantages including but not limited to, reduction in one or more of current mode regulator circuit complexity, size, and cost. Increased efficiency and/or reliability may also be realized. While the invention has been described with reference to certain illustrative embodiments, those described herein are not intended to be construed in a limiting sense. For example, variations or combinations of steps or materials in the embodiments shown and described may be used in particular cases without departure from the invention. All of the aspects of implementations of the current mode regulator techniques described and shown can be combined in various ways. Various modifications and combinations of the illustrative embodiments as well as other advantages and embodiments of the invention will be apparent to persons skilled in the arts upon reference to the drawings, description, and claims.

We claim:

1. A circuit comprising:
   a current monitor at an output node configured to compare an output signal to a reference;
   a first isolated communication link configured to provide feedback from the monitored output node to a primary side of a current mode regulator; and
   a second isolated communication link configured to provide the feedback from the monitored output node to a fly-back regulator.

2. The circuit of claim 1 wherein the primary side is configured to receive an input signal at an input node.

3. The circuit of claim 1 further comprising a secondary side isolated from the primary side and configured to receive a signal from the primary side.

4. The circuit of claim 1 wherein the current mode regulator comprises the primary side and a secondary side, and is configured to rectify an input signal and to provide the rectified input signal to the output node.

5. The circuit of claim 1 wherein the current mode regulator is configured to use the feedback to regulate the signal provided to the output node.

6. An electronic system comprising:
   a current mode regulator having a primary side configured to receive an input signal at an input node, the primary side operably coupled to:
   a secondary side configured to receive a signal from the primary side, the secondary side having an output node for outputting an output signal; and an isolated communication link configured to provide feedback from the output node to the primary side of a first regulator; and a stand-by power supply comprising a second isolated communication link configured to provide feedback from the output node to the primary side of a second regulator.

7. The electronic system of claim 6 wherein the first regulator spans the primary side and the secondary side and is configured to rectify the input signal and to provide the rectified input signal to the output node.

8. The electronic system of claim 6 further comprising a current monitor at the output node configured to compare the output signal to a reference.

9. The electronic system of claim 6 wherein the first regulator is configured to use the feedback to regulate a signal provided to the output node.

10. The electronic circuit of claim 6 further comprising a second regulator operably coupled to a primary side voltage.

11. The electronic circuit of claim 6 further comprising a standby regulator, wherein the stand-by power supply is adapted to be responsive to feedback passed from the stand-by regulator to a second regulator through the communication link.

12. A method for current mode regulation comprising:
maintaining isolation between a primary side and a secondary side with a first isolation circuit;
providing feedback from a monitored output node to the primary side;
providing second feedback through a second isolation circuit to a flyback regulator; and
regulating a signal provided to the output node using the feedback.

13. The method of claim 12 further comprising receiving an input signal at an input node to a primary side and generating the signal provided to the output node using the input signal.

14. The method of claim 12 further comprising:
receiving an input signal at an input node to a primary side;
rectifying the input signal; and
regulating the transfer of the rectified signal to the isolated secondary side.

15. The method of claim 12 further comprising:
receiving an input signal at an input node to a primary side;
rectifying the input signal;
regulating the transfer of the rectified signal to the isolated secondary side; and
transferring the rectified secondary side signal to the output node.

16. The method of claim 12 further comprising comparing the signal at the output node with a reference to generate the feedback.

* * * * *

UNITED STATES PATENT AND TRADEMARK OFFICE
CERTIFICATE OF CORRECTION

PATENT NO.           : 9,954,448 B2  
APPLICATION NO.      : 15/155909  
DATED                : April 24, 2018  
INVENTOR(S)          : Ross E. Teggatz et al.

Page 1 of 1

It is certified that error appears in the above-identified patent and that said Letters Patent is hereby corrected as shown below:

On the Title Page

1. In item (57), under "ABSTRACT", in Column 2, Line 4, delete "secondary for" and insert -- secondary side for --, therefor.

In the Claims

2. In Column 7, Line 19, in Claim 10, delete "electronic circuit of claim" and insert -- electronic system of claim --, therefor.

3. In Column 7, Line 21, in Claim 11, delete "electronic circuit of claim" and insert -- electronic system of claim --, therefor.

4. In Column 8, Line 8, in Claim 13, delete "a primary" and insert -- the primary --, therefor.

5. In Column 8, Line 11, in Claim 14, delete "a primary" and insert -- the primary --, therefor.

6. In Column 8, Line 17, in Claim 15, delete "a primary" and insert -- the primary --, therefor.

Signed and Sealed this  
Eleventh Day of December, 2018

Andrei Iancu  
*Director of the United States Patent and Trademark Office*